United States Patent
Spallek et al.

(10) Patent No.: US 8,039,773 B2
(45) Date of Patent: Oct. 18, 2011

(54) METHOD AND APPARATUS FOR THE REPAIR OF GAS-TURBINE BLISKS

(75) Inventors: Martin Spallek, Lahnau (DE); Thomas Haubold, Wehrheim (DE); Leping Zhu, Darmstadt (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 779 days.

(21) Appl. No.: 12/213,877

(22) Filed: Jun. 25, 2008

(65) Prior Publication Data

US 2009/0001059 A1    Jan. 1, 2009

(30) Foreign Application Priority Data

Jun. 27, 2007   (DE) .................. 10 2007 029 728

(51) Int. Cl.
 *B23K 26/34*   (2006.01)
(52) U.S. Cl. ......... 219/121.63; 219/121.64; 219/121.84; 29/889.1; 228/119; 228/159; 148/525
(58) Field of Classification Search ............ 219/121.63, 219/121.64, 121.84; 29/889.1, 402.09–402.13, 29/402.16; 228/119, 159–162; 148/525
See application file for complete search history.

(56) References Cited

U.S. PATENT DOCUMENTS

| | | | |
|---|---|---|---|
| 5,038,014 A | 8/1991 | Pratt | |
| 5,102,221 A | 4/1992 | Desgranges | |
| 5,624,380 A * | 4/1997 | Takayama et al. | 600/146 |
| 5,735,044 A * | 4/1998 | Ferrigno et al. | 29/889.1 |
| 5,803,680 A | 9/1998 | Diener | |
| 6,202,302 B1 | 3/2001 | Descoteaux | |
| 6,269,540 B1 | 8/2001 | Islam et al. | |
| 6,542,230 B1 | 4/2003 | Luke | |
| 6,568,077 B1 | 5/2003 | Hellemann | |
| 6,593,540 B1 | 7/2003 | Baker | |
| 2003/0221315 A1 | 12/2003 | Baumann | |
| 2005/0109744 A1 | 5/2005 | Baker et al. | |
| 2006/0042083 A1 | 3/2006 | Baker et al. | |
| 2006/0258265 A1 | 11/2006 | Moeller et al. | |

FOREIGN PATENT DOCUMENTS

DE    690 03 349 T2   2/1994

(Continued)

OTHER PUBLICATIONS

European Search Report dated Jun. 21, 2010 from counterpart European patent application.

*Primary Examiner* — Samuel M Heinrich
(74) *Attorney, Agent, or Firm* — Timothy J. Klima; Shuttleworth & Ingersoll, PLC

(57) ABSTRACT

A method and an apparatus for repairing gas-turbine blisks uses an endoscope 15 provided with processing optics featuring a flexible light guide arrangement 16. A laser source 9 is connected to a flexible optical fiber arrangement 10, with a filler material feeder 7 for supplying welding flux via a flexible line 8, with a water supply 11 connected to a flexible line 12, and with an inert gas supply 13 connected to a flexible line 16 for supplying inert gas, with the flexible lines 8, 12, 14, the flexible light guide arrangement 16 and the flexible optical fiber arrangement 10 being combined to form a flexible long repair implement 17 at least at its distal end areas.

14 Claims, 5 Drawing Sheets

FOREIGN PATENT DOCUMENTS

Figure 1:
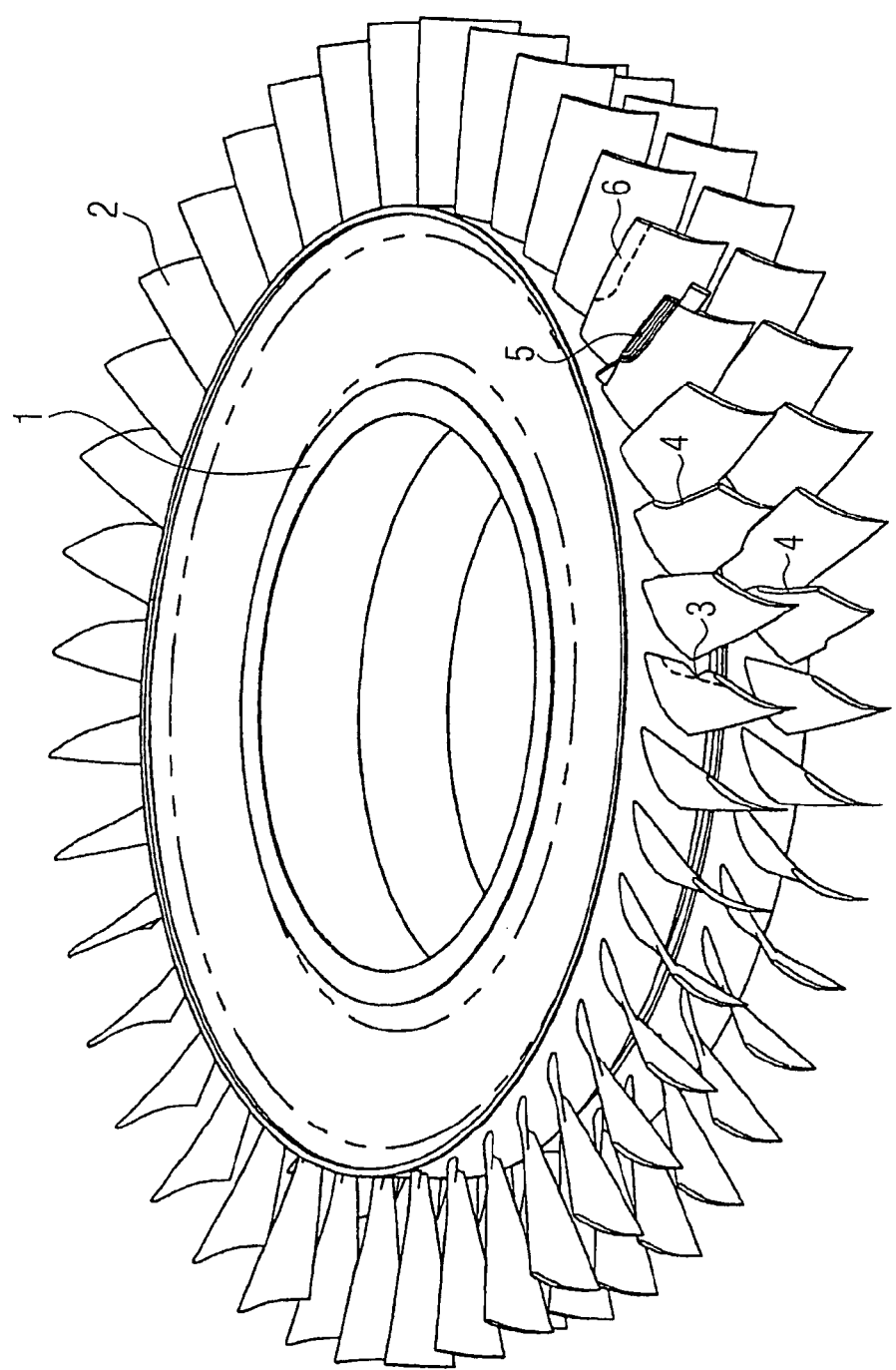

| | | |
|---|---|---|
| DE | 195 37 812 C1 | 1/1997 |
| EP | 13 71 812 A1 | 12/2003 |
| EP | 1 424 158 A | 6/2004 |
| EP | 15 35 692 B1 | 6/2005 |
| EP | 1743729 | 1/2007 |
| WO | WO 96/12873 A1 | 5/1996 |
| WO | WO 9612873 A | 5/1996 |
| WO | WO 0006336 A | 2/2000 |
| WO | WO 2006/026457 A1 | 3/2006 |

* cited by examiner

METHOD AND APPARATUS FOR THE REPAIR OF GAS-TURBINE BLISKS

This application claims priority to German Patent Application DE 102007029728.0 filed Jun. 27, 2007, the entirety of which is incorporated by reference herein.

The present invention relates to a method and an apparatus for the repair of gas-turbine blisks.

Modern compressors increasingly employ blisk (bladed disk) technology to provide optimum flow conditions and high compressor efficiency in combination with low weight. In a blisk design, the disk and the blades form a single component, unlike the conventional blade-disk arrangement in which the blades and the disk are manufactured separately before being assembled. Since the compressor blades are subject to erosion caused by sand and dust and to FOD (foreign object damage), i.e. impact of foreign objects, such as stones, hail, etc., repairability of the blades in the compressor section is an indispensable requirement. In the case of the conventional blade-disk design, the individual blades will normally be replaced as their repair is uneconomical compared to the new-part price. In the case of blisk design, however, the blades cannot be replaced easily, so that the development of a repair method is of particular interest.

The general repair techniques that have been tested and developed for blisks include removing the damaged blade and linear friction re-welding (EP 1 535 692 A1) as well as restoration of the blade contour by TIG build-up welding, laser build-up welding or other welding processes (U.S. Pat. No. 5,038,014). Build-up welding employs the basic operations of removal of the damaged blade portion by machining, build-up welding, heat treatment, and milling to specified dimensions.

Furthermore, U.S. Pat. No. 6,568,077 B1 describes a repair method in which defined portions of the blade are cut-off and "inserts" are welded in.

Minor damage may also be removed by mechanical machining (grinding, blending) to such an extent that it is acceptable for further operations, without the need to restore the original geometry.

The known state of the art is disadvantageous in that the repair welding methods are only possible in the demounted state, i.e. require full disassembly of the engine, entailing considerable disassembly costs and long dead or down times of the aeronautical equipment.

In a broad aspect, the present invention provides for a method and an apparatus for the repair of gas-turbine blisks, which enable the repair of non-demounted gas turbines, while featuring a simple design and easy, cost-effective applicability.

Accordingly, it is a first object of the present invention to provide an apparatus comprising a flexible, long repair implement which is insertable into the interior of the gas turbine either through the fan or through assembly openings. It enables damaged zones to be detected by way of observation with an endoscope, removed at least partly, if applicable, and repaired by build-up welding without disassembling the gas turbine. Thus, the apparatus enables repairs to be accomplished on-site, for example on gas turbines installed on the aircraft (on-wing).

As regards the method, the present invention provides for rapid and cost-effective repair without requiring disassembly of the gas turbine. This permits substantial savings in time and costs to be made.

The present invention relates to a method which enables material to be built up and, thus, the geometry of blade regions on blisk components to be restored without disassembly, i.e. on-wing. This is accomplished by means of an endoscopic welding apparatus.

This apparatus can be configured as follows:

Analogically to borescopic blending, a laser wave guide, a laser welding head and a filler material feeder—preferably a flux feeder—is introduced through the maintenance openings of the engine alongside the inspection optics and the grinder.

The repair sequence according to the present invention can be described as follows:

Introduction of the endoscopic apparatus (optics, grinder, laser welding head and wave guide as well as filler material feeder)

Inspection of the damage

Blending (removal) of the damaged zone

Build-up welding and reconstruction of the damaged zone

Mechanical rework of the built-up weld material for restoration of the geometry of the damaged zone Removal of the endoscopic apparatus By way of this method, the damage is here repaired to at least such an extent that the engine can be operated until the next scheduled maintenance.

The solution according to the present invention is advantageous in that it permits repairs of damage by material build-up, preferably in the blade area of both aircraft engines and industry gas-turbine engines, to be performed without prior disassembly of the entire engine, i.e. on-wing or at the site of operation. This permits substantial savings in disassembly costs to be made, but also considerable reductions in turn-around time. These factors accordingly result in a reduction of the dead or down time of the aeronautical equipment.

Figure 5:
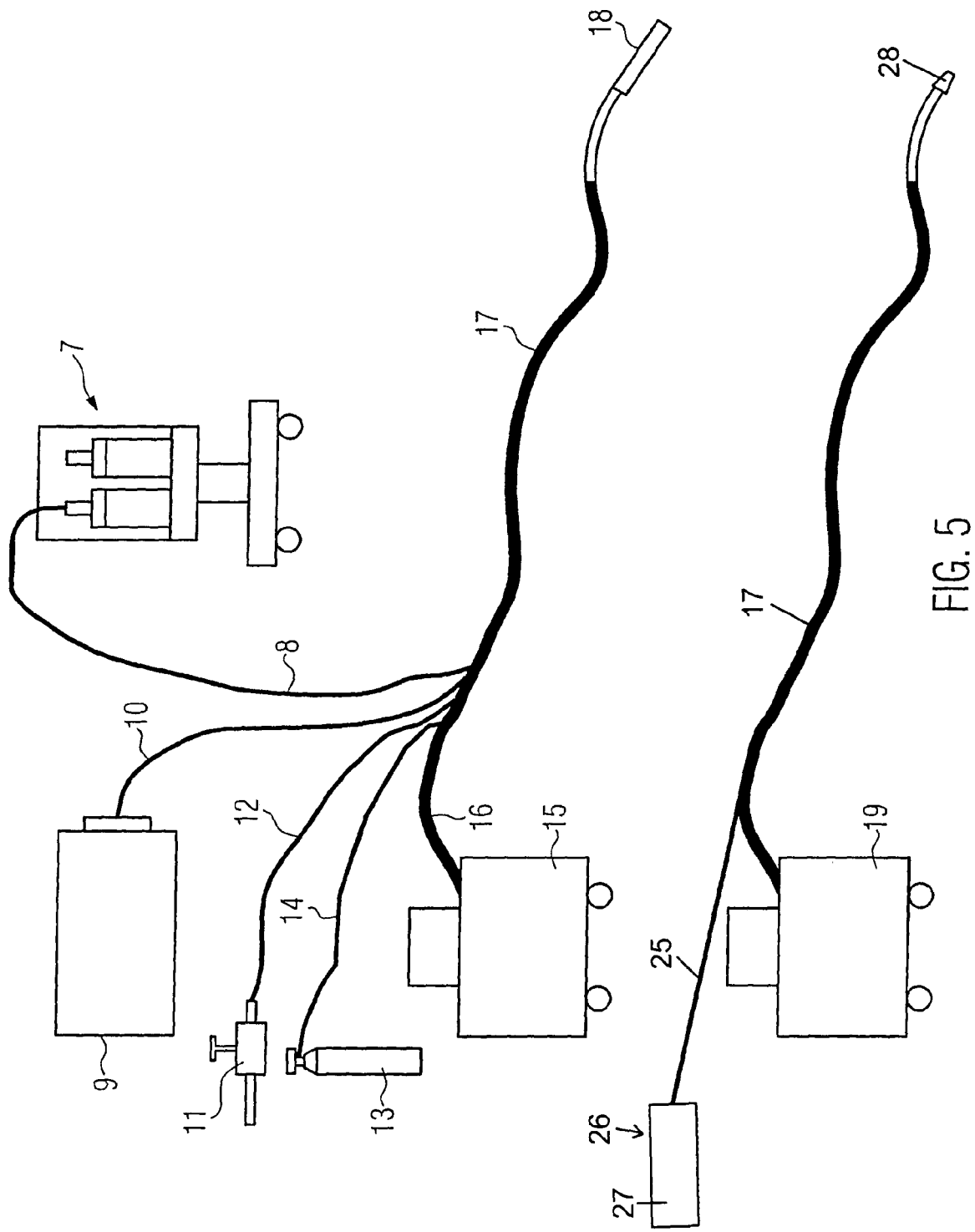
Figure 6:
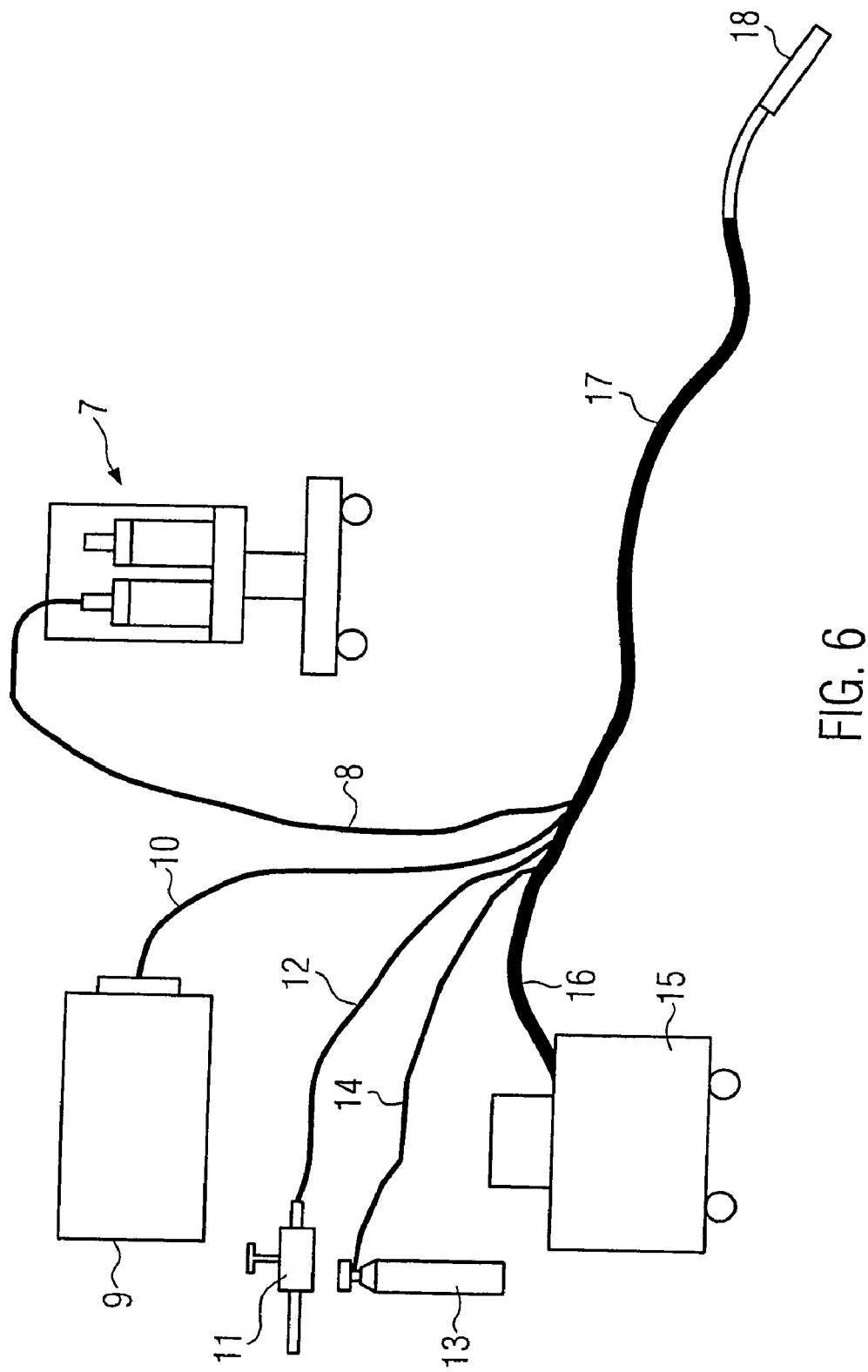
Figure 7:
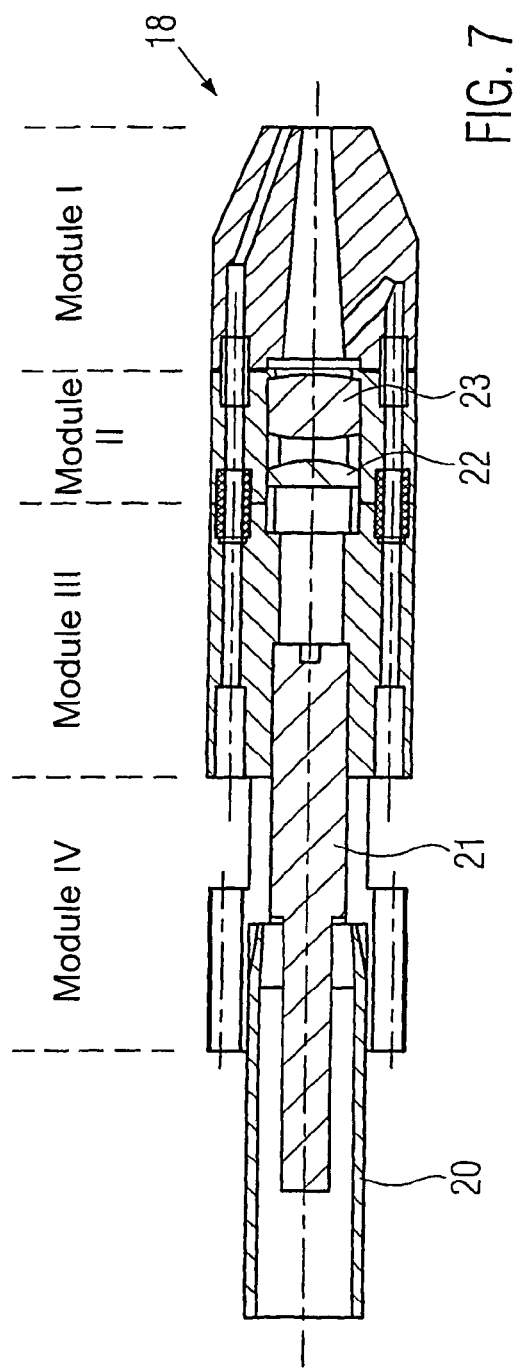
Figure 8:
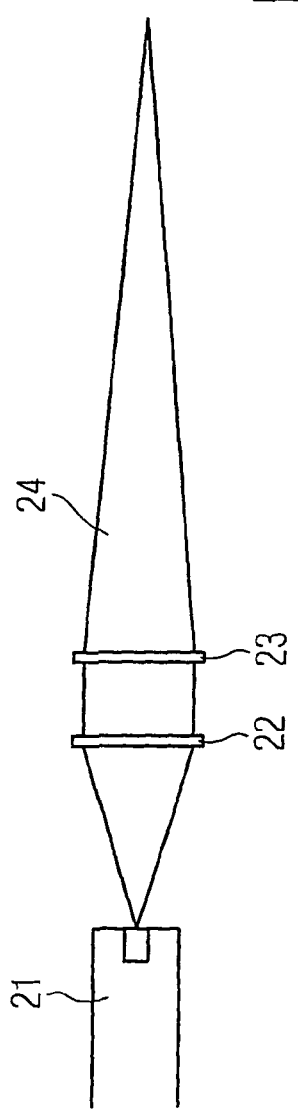

The present invention is more fully described in the light of the accompanying drawings showing preferred embodiments. In the drawings, FIG. 1 is a simplified perspective representation of a blisk featuring damaged zones and repaired passages, FIGS. 2 to 4 show different applications of the method and the apparatus in accordance with the present invention, FIG. 5 is a simplified representation of an example of a repair implement according to the present invention as well as of an associated observation endoscope, FIG. 6 is a representation, analogically to FIG. 5, of a repair implement with integrated observation endoscope, FIG. 7 is an enlarged sectional representation of the distal end area of an apparatus according to the present invention, and FIG. 8 is a schematic representation of the optical path of the processing optics.

FIG. 1 shows a disk 1 of a gas turbine which is integrally provided with blades 2. The component so formed is a blisk. Reference numeral 3 indicates a damaged zone of a blade 2 caused by impact of a foreign object. Reference numerals 4 each indicate a material removal region at which the damaged zone has been eliminated. Reference numeral 5 designates a repaired zone where repair by build-up welding has been performed. Reference numeral 6 designates a finish-repaired zone on a blade 2.

According to the present invention, damaged zones 3 are identified, prepared by a material removal method, for example grinding (removed zone 4), and repaired by build-up welding (repaired zone 5) and finished, if applicable, by surface treatment (repaired zone 6).

Figure 2:
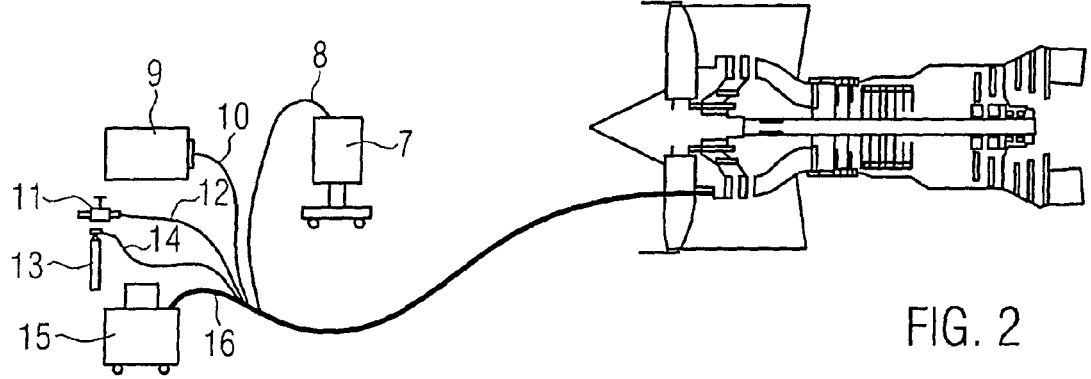
Figure 3:
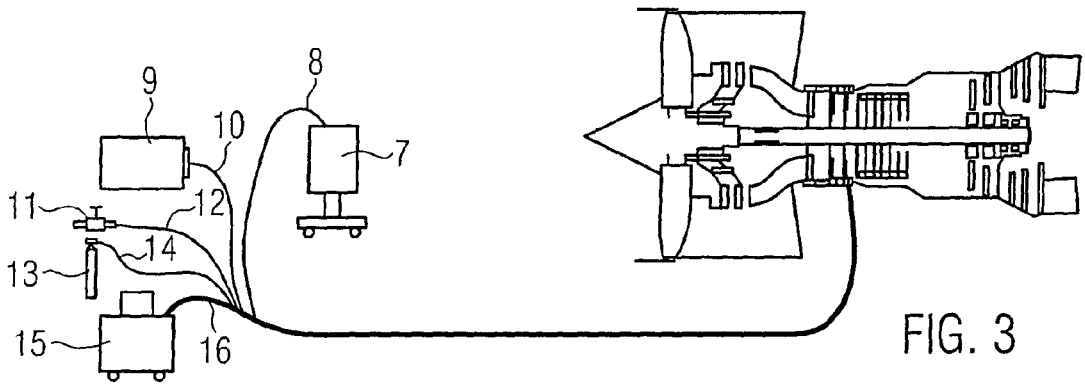
Figure 4:
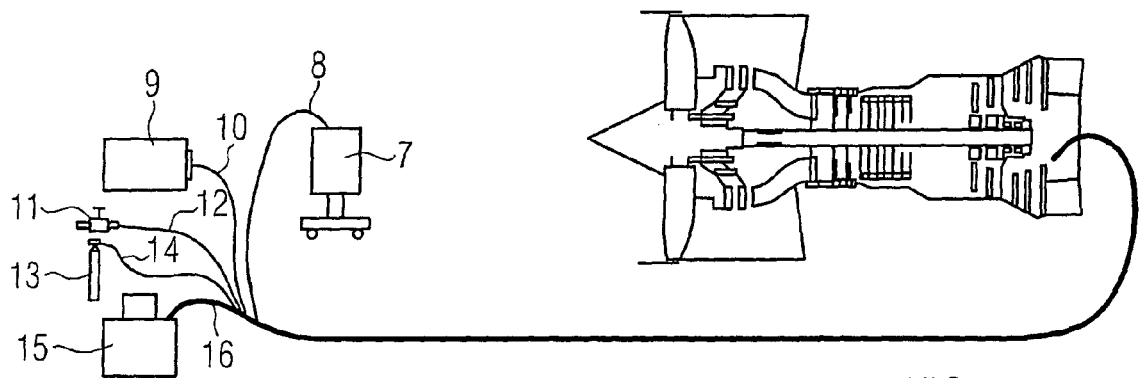

In accordance with the present invention, the repair is accomplishable in the assembled state of the gas turbine (aircraft gas turbine), as schematically shown in FIGS. 2 to 4. Repair is here accomplished such that the damaged item is accessed axially from the front of the engine (FIG. 2). Alternatively, repair can be accomplished by entering the engine from the side via machining openings (FIG. 3) or via its rear (FIG. 4).

FIGS. 5 and 6 show, in simplified representation, the configuration of the apparatus according to the present invention. A filler material feeder (flux feeder) 7 is here provided which is connected via a flexible line. A laser source 9 is connected via a light guide arrangement (optical fiber) 10. A water supply 11 is connected via a flexible line 12, while an inert gas supply 13 is connected via a flexible line 14. Reference numeral 15 designates an endoscope which is connected via a light guide arrangement 16.

FIG. 5 shows an endoscope 15 for the control of a common, flexible, long repair implement 17 including jointly the flexible lines 8, 12, 14, the optical fiber arrangement 10 and the light guide arrangement 16. The repair implement 17 carries at its top a welding head 18.

FIG. 5 shows an embodiment comprising a separate endoscope 19 with processing optics. The endoscope 15 provides for the control of the flexible, long repair implement 17 (guide tube) which can incorporate a flexible shaft 25 attached to a drive unit 27 of a grinding apparatus 26. A rotating grinding body 28 is attached to the flexible shaft 25 for removing damaged material. The grinding apparatus 26, flexible shaft 25, and rotating grinding body 28 can also be separate from the separate endoscope 19 and implement 17.

In the embodiment in FIG. 6, the endoscope 15 is designed such that it provides for both, control of the repair implement 17 and observation.

FIG. 7 shows, in simplified sectional view, a welding head 18 composed of different modules I to IV. Here, an end area of the repair implement 17 (guide tube 20) is shown. Reference numeral 21 shows fiber optics, with a collimator lens 22 and a focussing lens forming a part of the optical path to focus a laser beam 24, as schematically shown in FIG. 8.

LIST OF REFERENCE NUMERALS

1 Disk
2 Blade
3 Damaged zone
4 Material removal region
5 Repaired zone
6 Repaired zone
7 Filler material feeder (flux feeder)
8 Flexible line
9 Laser source
10 Optical fiber arrangement
11 Water supply
12 Flexible line
13 Inert gas supply
14 Flexible line
15 Endoscope
16 Light guide arrangement
17 Repair implement
18 Welding head
19 Endoscope
20 Guide tube
21 Fiber optics
22 Collimator lens
23 Focussing lens
24 Laser beam
25 Flexible shaft
26 Grinding apparatus
27 Drive unit
28 Rotating grinding body

What is claimed is:

1. An apparatus for repairing gas-turbine blisks, comprising:
a first endoscope provided with processing optics having a flexible light guide arrangement,
a laser source connected to a flexible optical fiber arrangement,
a filler material feeder for supplying welding flux via a first flexible line,
a water supply connected to a second flexible line, and
an inert gas supply connected to a third flexible line for supplying inert gas,
the three flexible lines, the flexible light guide arrangement and the flexible optical fibre arrangement being combined to form a flexible long repair implement at least at its distal end areas,
a second endoscope, and
a flexible grinding apparatus provided with a drive unit, which includes at a distal end area a rotating grinding body.

2. The apparatus of claim 1, wherein the flexible long repair implement forms a controllable guide tube.

3. A method for repairing gas-turbine blisks, comprising: providing:
a first endoscope provided with processing optics having a flexible light guide arrangement,
a laser source connected to a flexible optical fiber arrangement,
a filler material feeder for supplying welding flux via a first flexible line,
a water supply connected to a second flexible line, and
an inert gas supply connected to a third flexible line for supplying inert gas,
the three flexible lines, the flexible light guide arrangement and the flexible optical fibre arrangement being combined to form a flexible long repair implement at least at its distal end areas,
a second endoscope, and
a flexible grinding apparatus provided with a drive unit, which at its distal end area is provided with a rotating grinding body, and
guiding the repair implement to a zone of a gas turbine to be repaired while the gas turbine is in an installed state.

4. The method of claim 3, and further comprising: introducing the repair implement from a front direction via a fan of an aircraft gas turbine.

5. The method of claim 3, and further comprising: introducing the repair implement into an interior of the gas turbine via lateral openings.

6. The method of claim 3, and further comprising: introducing the repair implement into an interior of the gas turbine via a rear opening.

7. The method of claim 6, and further comprising: guiding the repair implement to a damage zone, subsequently assessing that damage, then blending the damaged zone, then repairing the damaged zone with material applied by build-up welding and then mechanically reworking the material applied to restore a geometry of the damaged zone.

8. The method of claim 7, wherein all steps are carried out in the installed state of the gas turbine.

9. The method of claim 3, and further comprising: guiding the repair implement to a damage zone, subsequently assessing that damage, then blending the damaged zone, then repairing the damaged zone with material applied by build-up welding and then mechanically reworking the material applied to restore a geometry of the damaged zone.

10. The method of claim 9, wherein all steps are carried out in the installed state of the gas turbine.

11. The method of claim 4, and further comprising: guiding the repair implement to a damage zone, subsequently assessing that damage, then blending the damaged zone, then repairing the damaged zone with material applied by build-up welding and then mechanically reworking the material applied to restore a geometry of the damaged zone.

12. The method of claim 11, wherein all steps are carried out in the installed state of the gas turbine.

13. The method of claim 5, and further comprising: guiding the repair implement to a damage zone, subsequently assessing that damage, then blending the damaged zone, then repairing the damaged zone with material applied by build-up welding and then mechanically reworking the material applied to restore a geometry of the damaged zone.

14. The method of claim 13, wherein all steps are carried out in the installed state of the gas turbine.

* * * * *